United States Patent Office 2,823,210
Patented Feb. 11, 1958

2,823,210

3-(1-ARYL-2-NITROALKYL)-2-CHLORO-THIOPHENES

Arnold N. Johnson, Wayne Township, Passaic County, N. J., assignor to Commercial Solvents Corporation, Terre Haute, Ind., a corporation of Maryland No Drawing. Application November 9, 1955
Serial No. 546,009

6 Claims. (Cl. 260—332.5)

My invention relates to 3-(1-aryl-2-nitroalkyl)-2-chlorothiophenes having the general formula:

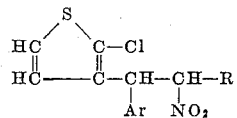

wherein R is an alkyl radical selected from the group consisting of methyl and ethyl and Ar is an aryl radical.

My new compounds result from the condensation, in the presence of concentrated sulfuric acid, of 2-chlorothiophene with 2-nitro-1-propanols and 2-nitro-1-butanols carrying an aryl group in the one positions. Examples of my new compounds include: 3-(1-phenyl-2-nitropropyl)-2-chlorothiophene, 3-(1-phenyl-2-nitrobutyl)-2-chlorothiophene, 3-(1-naphthyl-2-nitropropyl)-2-chlorothiophene, 3-(1-naphthyl-2-nitrobutyl)-2-chlorothiophene, 3 - (1 - p - chlorophenyl - 2 - nitropropyl) - 2 - chlorothiophene, 3-(1-p-chlorophenyl-2-nitrobutyl)-2-chlorothiophene, 3-(1-p-tolyl-2-nitropropyl)-2-chlorothiophene, 3-(1-p-tolyl-2-nitrobutyl)-2-chlorothiophene, 3-(1-xylyl-2 - nitropropyl) - 2 - chlorothiophene, 3-(1-xylyl-2-nitrobutyl) - 2 - chlorothiophene, 3 - [1-(3,4-methylenedioxyphenyl) - 2-nitropropyl] - 2 - chlorothiophene, 3-[1-(3,4-methylenedioxyphenyl) - 2 - nitrobutyl] - 2 - chlorothiophene, 3-[1-(diethylphenyl)-2-nitropropyl]-2-chlorothiophene, 3-[1-(diethylphenyl)-2-nitrobutyl]-2-chlorothiophene, 3-[1-(5,6,7,8-tetrahydro-2-naphthyl)-2-nitropropyl]-2-chlorothiophene, 3-[1-(5,6,7,8-tetrahydro-2-naphthyl)-2-nitrobutyl]-2-chlorothiophene, etc.

Generally, in the preparation of my new compounds, I introduce a mixture of 2-chlorothiophene with the concentrated sulfuric acid condensation agent into a reaction vessel and then slowly add the desired 1-aryl-2-nitro-1-alkanol while agitating the mixture. I can mix the sulfuric acid with an inert solvent such as carbon tetrachloride and slowly add the 2-chlorothiophene and 1-aryl-2-nitro-1-alkanol as a mixture in order to suppress possible side reactions. I prefer this latter method of addition of the reactants. After the reaction is completed I allow the mixture to settle, separate the resulting layers, steam distill the top layer, and dry the residue to obtain my new product.

The concentrated sulfuric acid employed as a condensation agent can vary in its water content from about 2% to about 20% without appreciably affecting the yield of the desired product. The reaction will proceed at temperatures ranging from about 5° to about 50° C. However I prefer to conduct the reaction at from about 15° to about 30° C. to minimize side reactions.

As starting materials for my new compounds I can employ 2-chlorothiophene and any of the 1-aryl-2-nitro-1-alkanols having the general formula:

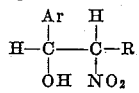

wherein R is methyl or ethyl and Ar is an aryl radical.

Suitable nitroalcohol reactants include 2-nitro-1-phenyl-1-propanol, 2-nitro-1-phenyl-1-butanol, 2-nitro-1-naphthyl-1-propanol, 2-nitro-1-naphthyl-butanol, 2-nitro-1-chlorophenyl-1-propanol, 2-nitro-1-chlorophenyl-1-butanol, 2-nitro-1-tolyl-1-propanol, 2-nitro-1-tolyl-1-butanol, 2-nitro-1-xylyl-1-propanol, 2-nitro-1-xylyl-1-butanol, 2-nitro-1-(3,4-methylenedioxyphenyl)-1-propanol, 2-nitro-1-(3,4-methylenedioxyphenyl) - 1 - butanol, 2 - nitro - 1-diethylphenyl-1-propanol, 2-nitro-1-diethylphenyl-1-butanol, 2-nitro - 1 - (5,6,7,8-tetrahydro-2-naphthyl)-1-propanol, 2-nitro-1-(5,6,7,8-tetrahydro-2-naphthyl)-1-butanol, etc.

The 1-aryl-2-nitro-1-propanol and butanol used in producing my new compounds can be prepared by reacting 1-nitroethane or 1-nitropropane respectively with the appropriate aryl aldehyde. To obtain 2-nitro-1-phenyl-1-butanol, for example, benzaldehyde is reacted with 1-nitropropane; 2-nitro-1-chlorophenyl-1-butanol is obtained by employing p-chlorobenzaldehyde; p-tolualdehyde is employed to obtain 2-nitro-1-tolyl-1-alkanol; piperonal is employed to obtain 2 - nitro - 1 - (3,4 - methylenedioxyphenyl)-1-alkanol; 5,6,7,8-tetrahydro-2-naphthaldehyde is employed to obtain 2-nitro-1-(5,6,7,8-tetrahydro-2-naphthyl)-1-alkanol; etc. A convenient method for producing the 2-nitro-1-aryl-1-alkanol as applied to 2-nitro-1-chlorophenyl-1-butanol involves agitating a mixture of 3 moles of 1-nitropropane and 1 mole of p-chlorobenzaldehyde for 3 hours at 25° C. after the slow addition of 0.1 mole of 3.6 N alcoholic potassium hydroxide thereto. The mixture is then acidified with 85% phosphoric acid, an emerald green color being an indication that the desired pH of 2 is obtained. Excess 1-nitropropane is then removed by steam distillation and the water layer separated from the product.

The following specific examples are offered to illustrate my invention and it is not intended that my invention be limited to the specific amounts and proportions set forth therein.

*Example I*

In a 1,000-ml. beaker were mixed 121 gm. (1.02 moles) of 2-chlorothiophene, 200 ml. of carbon tetrachloride, and 150 ml. of 85% sulfuric acid. To this mixture was added over a 30-minute period a mixture of 58.3 gm. (0.253 mole) of 2-nitro-1-p-chlorophenyl-1-butanol and 100 ml. of carbon tetrachloride, while maintaining the temperature during the addition between 20° and 25° C. The resulting mixture was agitated for one hour and then allowed to settle. The resulting two layers were separated and the top layer steam distilled. The residue from the steam distillation was dried with benzene and under a vacuum to yield 71.3 gm. (0.216 mole) of 3-(1-p-chlorophenyl-2-nitrobutyl)-2-chlorothiophene, which represented a theoretical yield of 85.5%.

*Example II*

A mixture of 100 ml. of 85% sulfuric acid and 100 ml. of carbon tetrachloride was placed in a water-cooled vessel. To this mixture was added dropwise over a 45-minute period with agitation a mixture of 35.4 gm. (0.181 mole) of 2-nitro-1-p-tolyl-1-propanol, 60.3 gm. (0.507 mole) of 2-chlorothiophene, and 100 ml. of carbon tetrachloride. The addition of both reactants to the sulfuric acid in this manner was designed to suppress possible side reactions. After agitation for one hour the resulting layers were separated, the top layer washed with water, and steam distilled. The residue from the steam distillation was dried by benzene and under a vacuum, and resulted in 40.5 gm. (0.137 mole) of 3-(1-p-tolyl-2-nitropropyl)-2-chlorothiophene, which represented a yield of 75.8% of theoretical.

*Example III*

In an 800-ml. beaker, ice cooled, were mixed 120.2 gm. (1.01 moles) of 2-chlorothiophene, 150 ml. of 85% sulfuric acid, and 200 ml. of carbon tetrachloride. To this mixture was added by dropwise addition over a 25-minute period 52.4 gm. (0.251 mole) of 2-nitro-1-p-tolyl-1-butanol. The resulting mixture was agitated for 1 hour and then allowed to settle. The resulting layers were separated, the top layer washed and steam distilled. After drying with benzene and by vacuum the residue constituted 66.1 gm. (0.214 mole) of a dark, viscous 3-(1-p-tolyl-2-nitrobutyl)-2-chlorothiophene which represented a yield of 85.3% of theoretical.

Example IV

In a water-cooled vessel were mixed 100 ml. of 85% sulfuric acid and 100 ml. of carbon tetrachloride. To the resulting mixture was added by dropwise addition over a 25-minute period, a mixture of 18.5 gm. (0.082 mole) of 2-nitro-1-xylyl-1-butanol and 40.0 gm. (0.337 mole) of 2-chlorothiophene. After an additional one-half hour of agitation the resulting mixture was allowed to settle. The product was separated from the settled mixture by extraction with two portions of carbon tetrachloride, the first 200 ml. and the second 100 ml. The carbon tetrachloride extractant was washed and steam distilled. After benzene and vacuum drying of the residue, 10.5 gm. (0.034 mole) of 3-(1-xylyl-2-nitrobutyl)-2-chlorothiophene in the form of a brown-black viscous oil was obtained which represented a yield of 45.2% of theoretical.

Example V

To a mixture of 100 ml. of 85% sulfuric acid and 100 ml. of carbon tetrachloride in a water-cooled 600-ml. beaker was added by dropwise addition a mixture of 22.5 gm. (0.094 mole) of 2 - nitro - 1 - (3,4-methylenedioxyphenyl)-1-butanol, 52.9 gm. (0.45 mole) of 2-chlorothiophene, and 50 ml. of carbon tetrachloride. The addition required 30 minutes and the temperature was maintained between 20° and 25° C. The resulting mixture was agitated for one additional hour, allowed to settle, and the resulting layers separated. The top layer was washed and steam distilled. After benzene and vacuum drying, the residue constituted a product of 11.1 gm. (0.031 mole) of 3-[1-(3,4-methylenedioxyphenyl)-2-nitrobutyl]-2-chlorothiophene which represented a yield of 33% of theoretical.

Example VI

A mixture of 18.5 gm. (0.074 mole) of 2-nitro-1-(5,6,7,8-tetrahydro-2-naphthyl)-1-butanol and 26.5 gm. (0.223 mole) of 2-chlorothiophene was added by dropwise addition to a mixture of 100 ml. of 85% sulfuric acid and 100 ml. of carbon tetrachloride. The addition required 15 minutes and the temperature was maintained between 18° and 23° C. The resulting mixture was agitated for an additional hour and one-half, allowed to settle, and the resulting layers separated. The top layer was washed with dilute sodium bicarbonate solution and steam distilled. The residue was dried with benzene and by vacuum to yield 26.8 gm. (0.076 mole) of 3-[1 - (5,6,7,8-tetrahydro-2-naphthyl)-2-nitrobutyl]-2-chlorothiophene in the form of black tar.

Example VII

A mixture of 22.2 gm. (0.089 mole) of 2-nitro-1-diethylphenyl-1-butanol and 35.4 gm. of 2-chlorothiophene was added by dropwise addition to a mixture of 100 ml. of 85% sulfuric acid, 100 ml. of carbon tetrachloride, and 18.2 gm. of chlorothiophene. The addition required 15 minutes and the temperature was maintained between 20° and 25° C. The resulting mixture was agitated for an additional hour and allowed to settle overnight. The resulting layers were then separated, the top layer washed with dilute sodium bicarbonate solution, and steam distilled. The residue from the steam distillation, after drying with benzene, constituted a product of 23.6 gm. (0.067 mole) of 3-[1-(diethylphenyl)-2-nitrobutyl]-2-chlorothiophene.

Example VIII

In a 600-ml. beaker were mixed 35.5 g. (0.145 mole) of 2-nitro-1-naphthyl-1-butanol, 54.6 g. (0.455 mole) of 2-chlorothiophene and 100 ml. of carbon tetrachloride. To this mixture was added over a 30-minute period a mixture of 100 ml. of 85% sulfuric acid and 100 ml. of carbon tetrachloride while maintaining the temperature between 20° C. and 25° C. The resulting mixture was agitated for one hour and then allowed to settle. The layers were separated and the top layer steam distilled. The residue from the steam distillation was dried to yield 45.2 g. of 3-(1-naphthyl-2-nitrobutyl)-2-chlorothiophene, a yield of 90.3%.

My new compounds are useful as insecticides possessing high activity against a variety of insects. A number of different carriers can be used in formulating my new compounds as insecticidal agent. Effective concentrations can be produced in liquid carriers such as lower aliphatic alcohols (methyl, ethyl, propyl, butyl), chlorinated hydrocarbons (carbon tetrachloride, dichloromethane, trichloroethane, etc.), coal distillation solvents (benzene, xylene, toluene, etc.), etc. Household kerosene or deodorized kerosene and other like petroleum distillates can also be used. Aqueous emulsions can be made and are advantageous in some cases. Solid vehicles can also be employed and I can use any of the powdered aluminum silicates or silicas which are commonly employed such as pyrophyllite, bentonite, fuller's earth, kieselguhr, kaolin, talc, etc. An excellent insecticidal powder is obtained by absorbing 1% of 3-[1-(3,4-methylenedioxyphenyl)-2-nitrobutyl] - 2-chlorothiophene dissolved in acetone on fuller's earth, drying, blending the dried mixture, and applying as a wettable powder. My compounds can be employed with other insecticidal agents such as pyrethrum, rotenone, derris extract, nicotine and organic thiocyanates.

An insecticidal composition containing 3-(1-p-chlorophenyl-2-nitrobutyl)-2-chlorothiophene was formulated as an emulsifiable solution in xylene at various concentrations. Houseflies were sprayed and retained in 14-mesh stainless steel cages for 24 hours. Dorsal and ventral surfaces of Wood Prolific Lima beams were sprayed for 10 seconds each and offered to southern army worm larvae, Mexican bean beetle larvae, and pea aphids. The insecticidal compositions were applied with a water spray tower operated at 10 lbs. per square inch and 10 seconds at the rate of 26 ml. discharge per minute. The test period for southern army worm larvae, Mexican bean beetle larvae and pea aphids was 48 hours. A 96% kill of houseflies was obtained at a concentration of 0.1%, 100% kill of Mexican bean beetle larvae at concentration of 0.01%, 90% kill of pea aphids at 0.01% and a 100% kill of southern army worm larvae was obtained at a concentration of 1.0% with a 60% kill being obtained at a concentration of 0.1%.

While the above examples described the preferred embodiments of my invention, it will be understood that departures therefrom may be made within the scope of the specification and claims. In general, it may be said that any modifications or equivalents that would ordinarily occur to those skilled in the art are to be considered as lying within the scope of my invention.

This application is a continuation-in-part of my application Serial No. 447,673 filed August 3, 1954, now abandoned.

Now having disclosed my invention, what I claim is:
1. The compounds represented by the formula

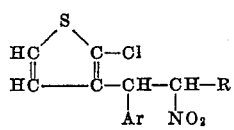

wherein R is a radical selected from the group consisting of methyl and ethyl and Ar is an aryl radical.
2. 3-(1-naphthyl-2-nitrobutyl)-2-chlorothiophene.
3. 3 - (1 - p - chlorophenyl - 2 - nitrobutyl) - 2 - chlorothiophene.
4. 3-(1-p-tolyl-2-nitrobutyl)-2-chlorothiophene.
5. 3-(1-xylyl-2-nitrobutyl)-2-chlorothiophene.
6. 3 - [1 - (3,4 - methylenedioxyphenyl) - 2 - nitrobutyl]-2-chlorothiophene.

References Cited in the file of this patent
UNITED STATES PATENTS

| | | |
|---|---|---|
| 2,516,186 | Hass | July 25, 1950 |
| 2,538,687 | Hass | Jan. 16, 1951 |